Patented Dec. 22, 1931

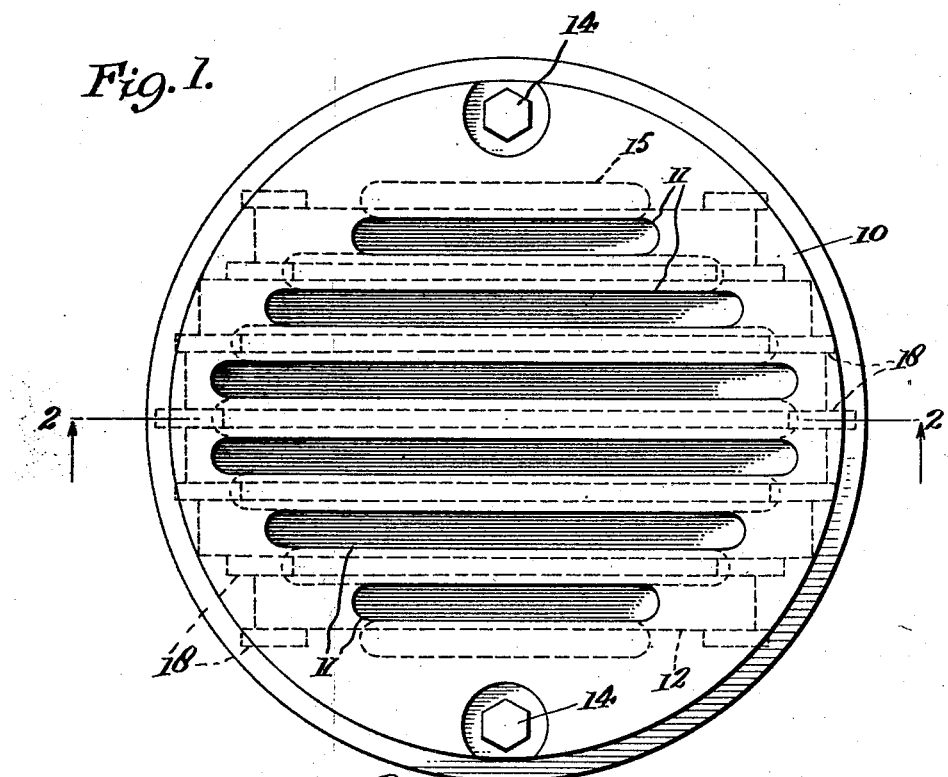
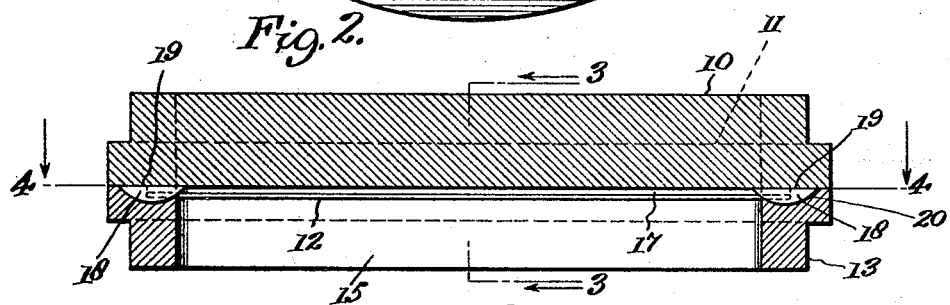
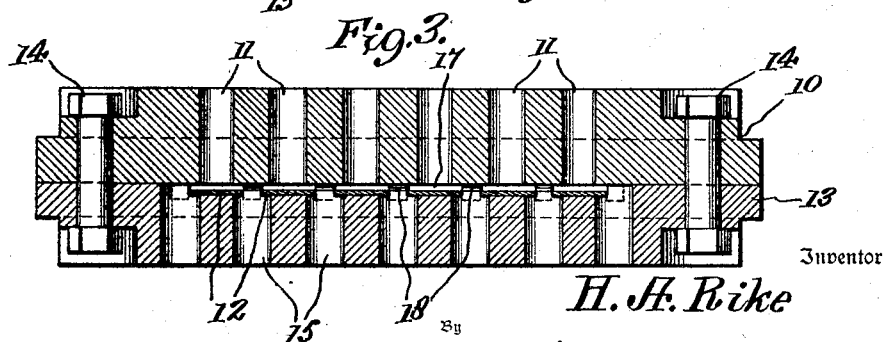

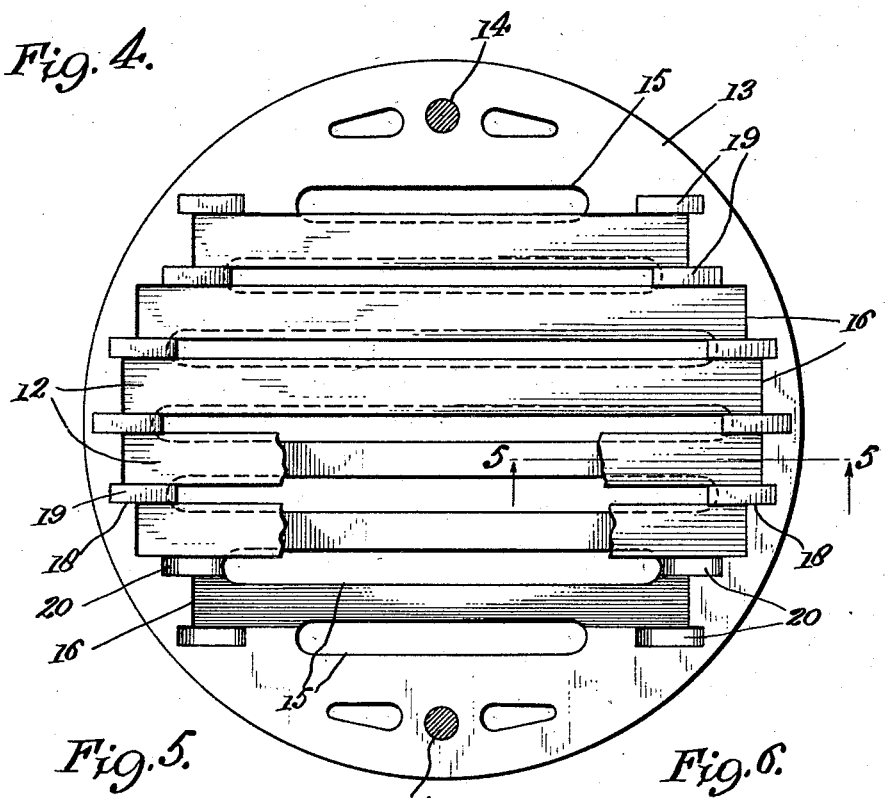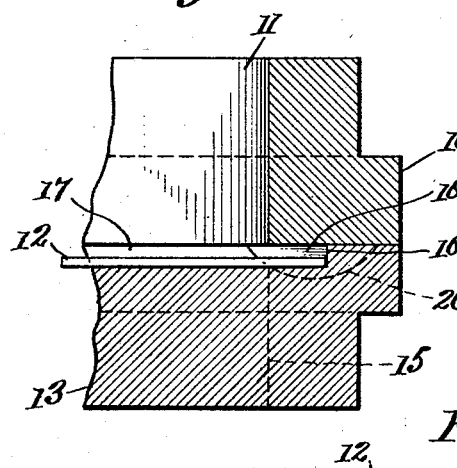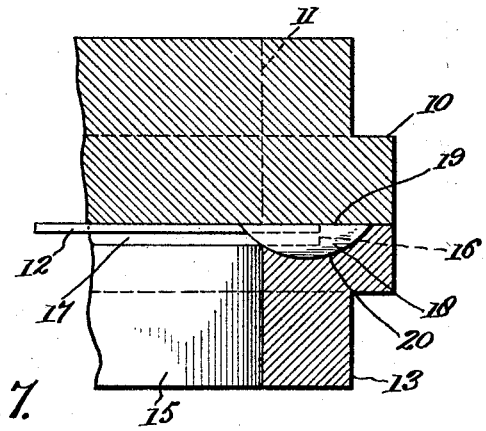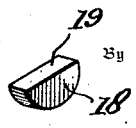

1,837,676

UNITED STATES PATENT OFFICE

HOWARD A. RIKE, OF NORPHLET, ARKANSAS

VALVE

Application filed November 10, 1930. Serial No. 494,709.

The present invention relates to valves, adapted particularly for use in compressors, and has for an object certain improvements in the construction of these valves which are known as of the feather type.

In the construction of the present used feather compressor valve, a plurality of plates or strips are employed which are of a flexible character and which under pressure are bowed or sprung away from their respective seats with the result that there is considerable wear, friction and generation of heat at the opposite ends of the strips; resulting in the undue wear of the body and guard plate of the valve and frequent breakage of the ends of the strips.

It is the purpose of the present invention to provide an improved structure wherein may be used relatively rigid flat strips or blades and wherein the blades may move bodily without bending toward and from their respective valve seats under the influence of the pressure medium passing back and forth through the valve.

Another object of the present invention is to provide improved means for separating the strips at their opposite ends and holding them in true alignment with their respective seats, this means also serving as wearing surfaces adapted to take up wear between the strips and the valve so that the means may be renewed from time to time and thus save the expense of providing new valves or valve parts.

The invention also aims at the provision of a feather compressor valve embodying the above characteristics and which maintains the general configuration and structure of valves of this type so that they may be readily substituted therefor and be manufactured with the desired capacity for the pressure medium without any appreciable change in the dimensions of the ports and other parts of the valve.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a face view of one side of the valve, showing the blades, wear keys and remote ports in dotted lines.

Figure 2 is a transverse section taken through the same substantially on the line 2—2 of Figure 1.

Figure 3 is a transverse section taken at right angles to the showing in Figure 2 and substantially on the line 3—3 of Figure 2.

Figure 4 is a section taken in the plane of the valve substantially on the line 4—4 of Figure 2.

Figure 5 is a fragmentary enlarged section taken transversely through the valve substantially on the line 5—5 of Figure 4, and showing one of the blades in open position.

Figure 6 is a similar view showing the blade in closed position.

Figure 7 is a detail perspective view of one of the blades or strips, and

Figure 8 is a detail perspective view of one of the wear keys employed.

Referring now to the drawings, 10 designates the valve body which is in the form of a plate of circular or other desired configuration and which is provided with a plurality of substantially parallel slots 11 through which fluid under pressure is adapted to pass. The inner face of the valve body 10 is relatively flat so as to provide valve seats around the slots 11, and the said flat inner face of the body valve is adapted to receive thereagainst a plurality of strips or blades 12 providing the movable elements of the valve.

There is a strip or blade 12 for each slot 11 as shown clearly in dotted lines in Figure 1, and the strips or blades are of sufficient width and length to overlap the marginal edges of the slots so as to effectively close the slots and prevent passage of the fluid under pressure in one direction through the valve body 10.

For the purpose of holding the strips or blades in position against the inner flat side of the valve body 10, a valve guard 13 is employed. The valve guard 13 may be in the form of a companion plate corresponding to the dimensions and configuration of the valve body 10 and which is adapted to be secured in face contact therewith by means of bolts 14 or the like. The valve guard 13 is provided with a plurality of slots 15 extending therethrough, which are disposed substantially in parallel relation to one another and which are also disposed in staggered or offset relation to the slots 11 in the valve body 10.

The strips or blades 12 are spaced apart so that fluid may pass about the edges thereof and thus be carried from the slots 11 into and through the slots 15 when the strips or blades 12 are in open position as shown in Figures 2 and 3.

As may be best seen from Figures 5 and 6, the valve guard is provided at opposite sides of its marginal edge portion and at its inner face with recesses or pockets 16 of a suitable width to freely receive therein the opposite ends of the strips or blades 12 and which are of a depth corresponding to the amplitude of vibratory movement of the strips or blades 12 during their opening and closing operations.

These pockets 16 are open against the inner flat side of the valve body 10, and are thus closed by the valve body when the two plates 10 and 13 are secured together. It will also be noted that the inner face of the valve guard is provided with shallow grooves or recesses 17 which correspond in width and depth to the width and depth of the pockets 16 and form continuations thereof, and which are also disposed in parallel relation to one another for receiving the blades or strips 12 and permitting the complete opening and closing movements thereof without flexing or bending the strips or blades. The strips or blades 12 may thus be formed of a cheaper material than is usually the case wherein the blades of the present construction of pressure valve must have inherent resiliency and must be of a very high grade material to withstand the continuous flexing or bending action.

For the purpose of holding the blades or strips 12 in spaced apart relation and to take up wear between the lateral edges thereof and the valve guard or blade 13, wear keys or blocks 18, shown in Figure 8, are employed and the same may be of segmental or other configuration presenting an inner flat face 19 for engagement against the inner flat face of the valve body 10. The valve guard is provided at opposite sides of each pocket 16 with a recess or depression 20, with its walls shaped to the configuration of the lower portion of the keys 18 so as to snugly receive the same and to thus bear against the opposite edges of the adjacent strips 12.

As shown, each block 18 has a rounded lower side and when its flat upper side 19 is engaged by the valve body 10, the key 18 is turned or rocked into proper alignment with the valve guard and the valve body. As shown in Figures 1, 3 and 4 particularly, these keys 18 are of a width equal substantially to the space between the lateral edges of the strips or blades 12 so that the strips or blades work directly against the opposite sides of these keys 18 and the latter thus take up the friction, heat and wear which is usually imposed upon the valve guard 13.

These wear keys 18 may be made of a relatively cheap or soft material so that the keys are relatively inexpensive and may be quickly and easily replaced when worn. This saves the wear and deteriorating effects upon the valve body 10, the valve guard 13 and the blades or strips 12.

A further feature of this construction is that the strips or blades 12 when moved to an open position provide a relative clearance which is of equal width from end to end of the blade and thus the valve has greater capacity for passage of fluid under pressure in the open position.

It is obvious that various changes and modifications may be made in the details of construction and design of the above specifically described embodiment of this invention without departing from the spirit thereof, such changes and modifications being restricted only by the scope of the following claims.

What is claimed is:—

1. In a feather compressor valve, a slotted valve body, a slotted valve guard secured against the inner face of the body, said valve guard having between its slots and at its inner face a plurality of grooves of substantially uniform depth throughout their lengths and disposed in register with the slots of the valve body, said valve guard also having recesses at opposite ends and at opposite sides of the grooves and having rounded bottom walls, flat inelastic valve strips disposed in said grooves for bodily movement toward and from the valve body, and wear keys seated in said recesses and having outer flat faces for engagement against the inner face of the valve body and having rounded lower faces for seating engagement in the recesses for aligning said keys with said grooves and strips when said body and valve guard are brought together.

2. In a feather compressor valve, a slotted valve body, a valve guard having slots therethrough in staggered relation to the slots in the valve body, said valve guard having in its inner face and between the slots thereof grooves of greater lengths than the respective adjacent slots and being in substantially uniform depth from end to end, flat valve strips disposed loosely in said grooves for movement throughout their lengths simultaneously and equally toward and from the adjacent face of the valve body to close and open the slots thereof, and removable keys of relatively soft material seated in the valve guard at its inner face and disposed against the inner face of the valve guard for holding the keys in place, said keys disposed between the lateral edges and adjacent the ends of the flat strips for maintaining the same in spaced apart relation and in line with the grooves of the valve body and for taking up wear between the strips and the valve guard.

HOWARD A. RIKE.